United States Patent
Chen et al.

(10) Patent No.: US 11,575,346 B2
(45) Date of Patent: Feb. 7, 2023

(54) PHOTOVOLTAIC MODULE FRAME, PHOTOVOLTAIC SUPPORT ASSEMBLY AND PHOTOVOLTAIC MODULE

(71) Applicant: Xiaoxuan Chen, Shanghai (CN)

(72) Inventors: Xiaoxuan Chen, Shanghai (CN); Dong Chen, Shanghai (CN)

(73) Assignee: Xiaoxuan Chen, Shanghai (CN)

( * ) Notice: Subject to any disclaimer, the term of this patent is extended or adjusted under 35 U.S.C. 154(b) by 0 days.

(21) Appl. No.: 17/081,895

(22) Filed: Oct. 27, 2020

(65) Prior Publication Data

US 2022/0166374 A1    May 26, 2022

(30) Foreign Application Priority Data

Oct. 23, 2020 (CN) .......................... 202011144475.X (51) Int. Cl.
*H02S 30/10* (2014.01)
(52) U.S. Cl.
CPC .................................... *H02S 30/10* (2014.12)
(58) Field of Classification Search
CPC ....................................................... H02S 30/10
See application file for complete search history.

(56) References Cited

U.S. PATENT DOCUMENTS

| | | | |
|---|---|---|---|
| 10,218,305 B1* | 2/2019 | Schrock | H02S 20/20 |
| 2013/0081673 A1 | 4/2013 | Kinyon | |
| 2014/0076383 A1* | 3/2014 | Potter | F24S 25/37 |
| | | | 248/346.03 |
| 2017/0163210 A1* | 6/2017 | Gorny | H02S 30/10 |
| 2020/0287502 A1 | 9/2020 | Sewalt | |

FOREIGN PATENT DOCUMENTS

| | | |
|---|---|---|
| CN | 201652899 U | 11/2010 |
| CN | 202049971 U | 11/2011 |
| CN | 103997283 A | 8/2014 |
| CN | 106712666 A | 5/2017 |
| CN | 206195683 U | 5/2017 |
| WO | WO/2019070122 A1 | 11/2019 |

OTHER PUBLICATIONS

Office Action received in Chinese Application No. CN 202011144475.X, dated Jun. 30, 2021 in 8 pages.
Notice of Allowance for Chinese Application No. 202011144475.X dated Jun. 6, 2022 (4 pages).
Third Office Action for Application for Chinese Application No. 202011144475.X dated Feb. 9, 2022 (8 pages).

* cited by examiner

*Primary Examiner* — Jayne L Mershon
(74) *Attorney, Agent, or Firm* — Knobbe, Martens, Olson & Bear, LLP (57) ABSTRACT

A photovoltaic module frame, a photovoltaic support assembly and a photovoltaic module are provided. The photovoltaic module frame includes an installation part. The top of the installation part is provided with at least one meshing structure for meshing with the bottom of a press block. By providing a meshing structure on the top of the installation part, the meshing structure is meshed with the bottom of the press block to increase the contact area between the installation part of the photovoltaic module frame and the bottom of the press block, thereby increasing the meshing force, and preventing the photovoltaic module frame from separating from the press block especially when the wind is strong.

18 Claims, 7 Drawing Sheets

PHOTOVOLTAIC MODULE FRAME, PHOTOVOLTAIC SUPPORT ASSEMBLY AND PHOTOVOLTAIC MODULE

CROSS-REFERENCE TO RELATED DISCLOSURES

The present application claims priority to Chinese Patent Application No. 202011144475.X, filed on Oct. 23, 2020, the content of which is incorporated herein by reference in its entirety.

TECHNICAL FIELD

The present disclosure relates to the field of photovoltaic technologies, and particularly, to a photovoltaic module frame, a photovoltaic support assembly and a photovoltaic module.

BACKGROUND

With the rapid development of solar photovoltaic cell and module technologies, the demand for high-efficiency photovoltaic modules is becoming more and more urgent. Increasing the cell size and expanding the module have become the market trends. The increase in module size is becoming more and more challenging for the installation of modules and the mechanical performance of resistance to extreme weather such as strong wind and heavy snow, therefore the safety risk during the operation of the power station may increase accordingly. Correspondingly, there is higher demand for the bearing capacity of the module frame.

Figure 1:
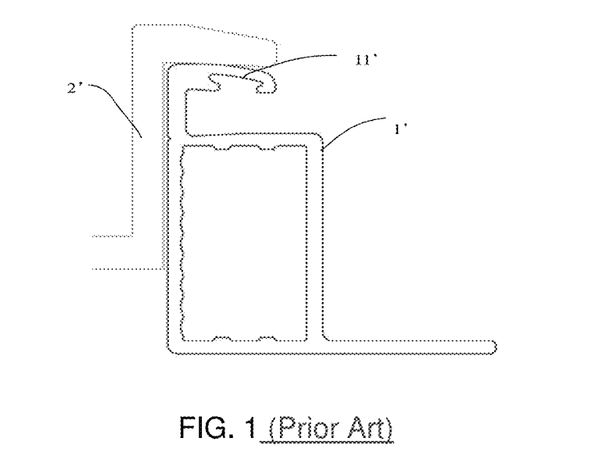
FIG. 1 is a schematic structural diagram showing a photovoltaic module frame in the related art.

Referring to FIG. 1, in the related art, the horizontal structure of a top of an installation part 11' of a photovoltaic module frame 1' is relatively short, with a downward arc structure having a certain angle, such a structure has a smooth surface and has a certain radian downward. The contact area between the press block 2' and the top of the photovoltaic module frame 1' is small, and the meshing force therebetween is not sufficient. When the wind is strong, the module photovoltaic module frame 1' is easily separated from the press block 2', causing the module to fall off and get damaged, and thereby bringing potential risks.

SUMMARY

The present disclosure provides a photovoltaic module frame, a photovoltaic support assembly, and a photovoltaic module, to solve the following problems in the related art that the photovoltaic module frame is easily separated from the press block when the wind is strong, causing the module to fall off and get damaged, and thereby bringing potential risks.

In a first aspect of the present disclosure, in order to solve the above problem, a photovoltaic module frame is provided, including an installation part having a top provided with at least one meshing structure for meshing with a bottom of a press block.

In an embodiment, each of the at least one meshing structure includes a plurality of protrusion structures spaced apart from each other, and the plurality of protrusion structures includes at least one of: a plurality of embossments separated from each other and a plurality of ribs arranged parallel to each other.

In an embodiment, a height of each of the plurality of protrusion structures protruding from the top of the installation part is less than or equal to 5 mm and greater than or equal to 0.1 mm.

In an embodiment, a distance between adjacent two of the plurality of protrusion structures is less than or equal to 5 mm and greater than or equal to 0.2 mm.

In an embodiment, the installation part includes a first installation part and a second installation part that are connected to each other, and an extending direction of a top of the first installation part is different from an extending direction of a top of the second installation part; and the meshing structure includes a first meshing structure provided on the top of the first installation part and a second meshing structure provided on the top of the second installation part, an extending direction of the protrusion structure of the first meshing structure is the same as an extending direction of the top of the first installation part, and an extending direction of the protrusion structure of the second meshing structure is perpendicular to an extending direction of the top of the second installation part.

In an embodiment, the top of the installation part has a first concave region or a first convex region, the at least one meshing structure is located at a position of the top corresponding to the first concave region or the first convex region.

In an embodiment, a depth of the first concave region is less than or equal to 2 cm, and a height of the first convex region is less than or equal to 2 cm.

In an embodiment, the installation part has a bottom opposite to the top, an orthographic projection of the meshing structure on the bottom has a first area S1, and an orthographic projection of the first convex region or the first concave region on the bottom has a second area S2, and the first area S1 and the second area S2 satisfy: $1.1*S1 \leq S2 \leq 1.3*S2$.

In an embodiment, the at least one meshing structure completely covers the entire top of the installation part.

In an embodiment, the top of the installation part includes a first region adjacent to a side wall of the installation part and a second region abutting with the first region, the first region is located between the second region and the side wall, and the at least one meshing structure is provided in the second region.

In an embodiment, the at least one meshing structure includes at least two meshing structures spaced apart from each other on the top of the installation part.

In an embodiment, the meshing structure includes at least one of a zigzag structure, a trapezoidal structure, a U-shaped structure, or a wave-shaped structure.

In a second aspect of the present disclosure, in order to solve the above problem, a photovoltaic support assembly is provided, including a photovoltaic module frame including an installation part having a top provided with at least one meshing structure for meshing with a bottom of a press block; and a press block meshing with the photovoltaic module frame, wherein a bottom of the press block has a matching structure meshing with the at least one meshing structure.

In an embodiment, the press block is a magnetic press block, and the photovoltaic module frame is a steel frame.

In an embodiment, the bottom of the press block has a second convex region or a second concave region, the matching structure is located at a position of the bottom corresponding to the second convex region or the second concave region, the second convex region corresponds to the first concave region, and the second concave region corresponds to the first convex region.

In an embodiment, the photovoltaic support assembly further includes an adhesive layer arranged between the meshing structure and the matching structure.

In a third aspect of the present disclosure, in order to solve the above problem, a photovoltaic module is provided, including a photovoltaic support assembly, wherein the photovoltaic support assembly includes: a photovoltaic module frame including an installation part having a top provided with at least one meshing structure for meshing with a bottom of a press block; and a press block meshing with the photovoltaic module frame, wherein a bottom of the press block has a matching structure meshed with the at least one meshing structure.

BRIEF DESCRIPTION OF DRAWINGS

One or more embodiments are exemplified by the corresponding drawings. The description is only exemplary and does not constitute any limitation to the embodiments. Elements with the same reference numbers in the drawings represent same or similar elements. Unless otherwise stated, the drawings does not constitute scale limitations.

Reference Signs for the Related Art:

| Reference signs | Term |
| --- | --- |
| 1' | photovoltaic module frame |
| 11' | installation part |
| 2' | press block |

Reference Signs for the Present Disclosure:

| Reference signs | Term |
| --- | --- |
| 1 | photovoltaic module frame |
| 11 | installation part |
| 111 | meshing structure |
| 112 | first region |
| 113 | second region |
| 114 | side wall |
| 2 | press block |
| 21 | matching structure |
| 3 | laminate |

The objectives, functional characteristics and advantages of the present disclosure will be further described in conjunction with the embodiments and the accompanying drawings.

DESCRIPTION OF EMBODIMENTS

The technical solutions in the embodiments of the present disclosure will be described below in conjunction with the accompanying drawings. It is appreciated that, the described embodiments are only some embodiments of the present disclosure, rather than all the embodiments. Based on the embodiments of the present disclosure, all other embodiments obtained by those of ordinary skill in the art shall fall within the protection scope of the present disclosure.

It should be noted that if there is a directional indication (such as up, down, left, right, front, back . . . ) in the embodiments of the present disclosure, the directional indication is only used to explain that a relative positional relationship, movement, etc. between the components in a specific perspective (as shown in the drawings). If the specific perspective changes, the directional indication may also change accordingly.

In addition, in the embodiments of the present disclosure, the expressions of "first", "second", etc. are only used for descriptive purposes, and shall not be understood as relative importance of instructions or implications or the number of technical features indicated implicitly. The features defined with "first" and "second" may explicitly or implicitly include at least one of the features. In addition, the technical solutions between the various embodiments may be combined with each other. When the combination of technical solutions is contradictory or cannot be achieved, it should be considered that such a combination of technical solutions does not exist, which is not within the protection scope of the present disclosure.

Figure 2:
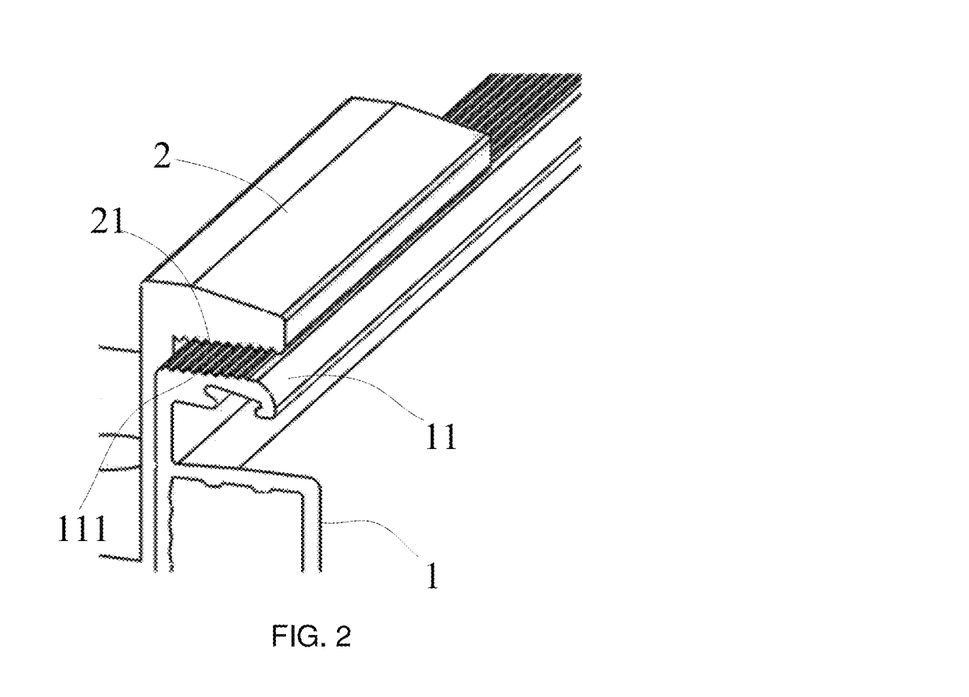
FIG. 2 is a perspective schematic diagram showing a photovoltaic module frame and a laminate according to an embodiment of the present disclosure.
Figure 3:
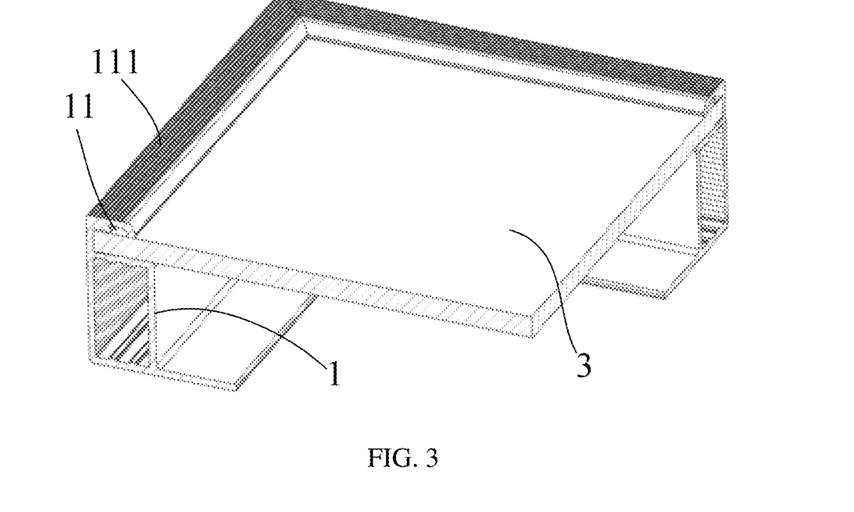
FIG. 3 is a perspective schematic diagram showing an embodiment of the photovoltaic module frame in FIG. 2.
Figure 4:
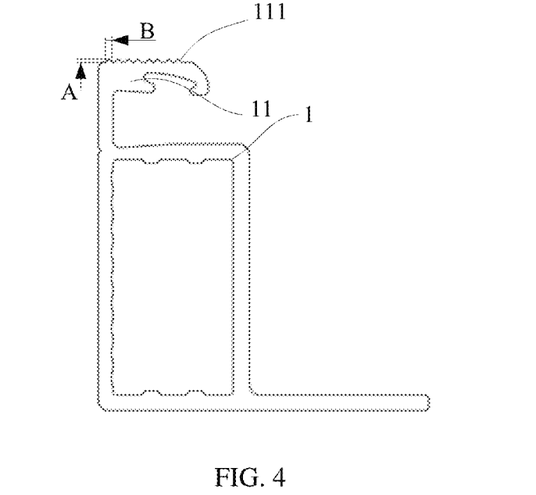
FIG. 4 is a schematic structural diagram of a meshing structure in FIG. 3 when being a zigzag structure.
Figure 5:
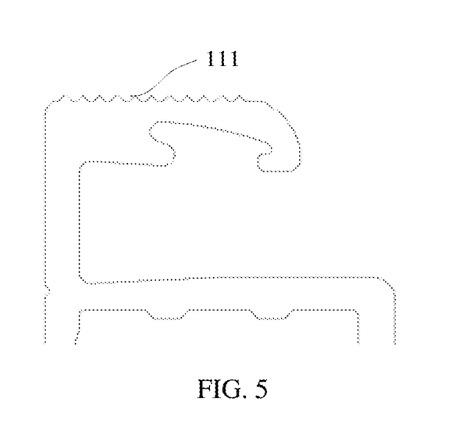
FIG. 5 is a schematic structural diagram of a meshing structure in FIG. 3 when being a wave-shaped structure.
Figure 6:
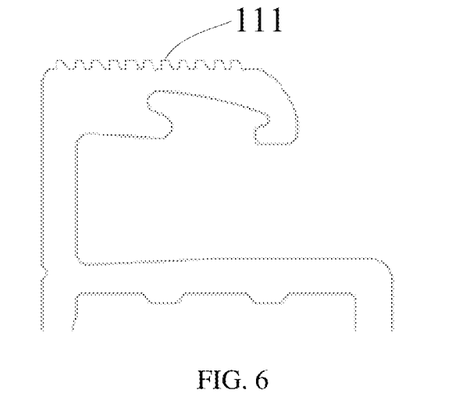
FIG. 6 is a schematic structural diagram of a meshing structure in FIG. 3 when being a trapezoidal structure.
Figure 7:
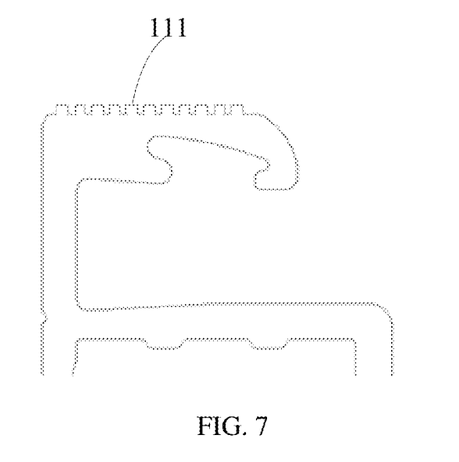
FIG. 7 is a schematic structural diagram of a meshing structure in FIG. 3 when being a U-shaped structure.
Figure 8:
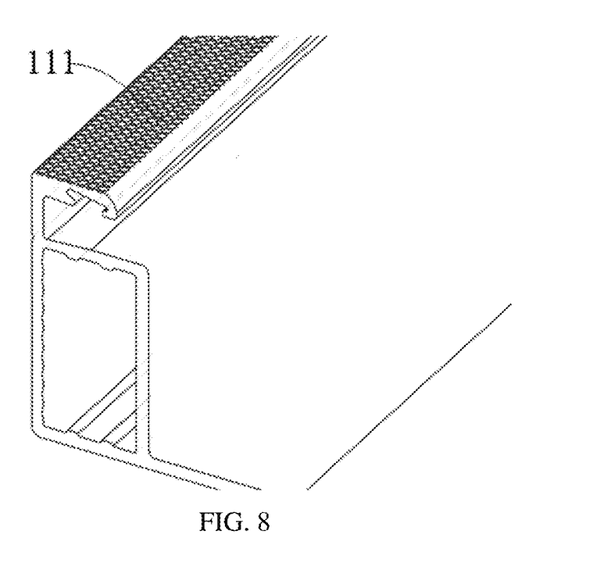
FIG. 8 is a schematic structural diagram of a meshing structure in FIG. 3 when being an embossment structure.
Figure 9:
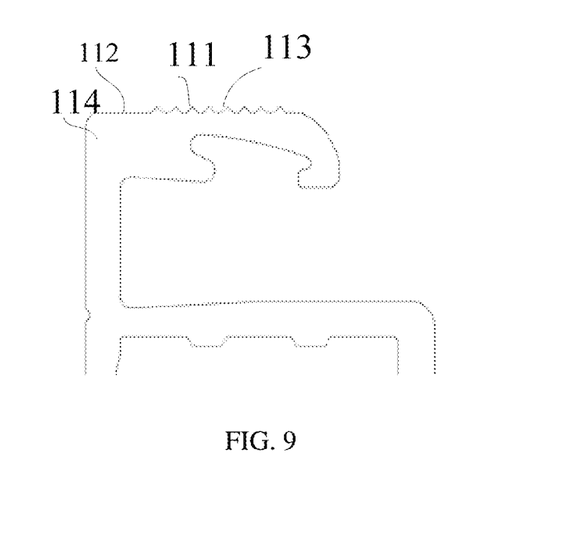
FIG. 9 is a schematic structural diagram showing a portion of a installation part in FIG. 3 according to another embodiment of the present disclosure.

FIG. 2 is a perspective diagram showing a photovoltaic module frame and a laminate according to an embodiment of the present disclosure, FIG. 3 is a perspective diagram showing an embodiment of the photovoltaic module frame in FIG. 2, FIG. 4 is a schematic structural diagram of a meshing structure in FIG. 3 when being a zigzag structure, FIG. 5 is a schematic structural diagram of a meshing structure in FIG. 3 when being a wave-shaped structure, FIG. 6 is a schematic structural diagram of a meshing structure in FIG. 3 when being a trapezoidal structure, FIG. 7 is a schematic structural diagram of a meshing structure in FIG. 3 when being a U-shaped structure, FIG. 8 is a schematic structural diagram of a meshing structure in FIG. 3 when being an embossment structure, and FIG. 9 is a schematic structural diagram showing a portion of the installation part in FIG. 3 according to another embodiment of the present disclosure. Referring to FIG. 2, the present disclosure provides a photovoltaic module frame 1. The photovoltaic module frame 1 includes an installation part 11.

The top of the installation part 11 is provided with at least one meshing structure 111 for meshing with the bottom of the press block 2.

In the present disclosure, by arranging a meshing structure 111 on the top of the installation part 11, the meshing structure 111 is meshed with the bottom of the press block 2, so that a contact area between the installation part 11 of the photovoltaic module frame 1 and the bottom of the press block 2 is increased, thereby increasing the meshing force, and preventing the photovoltaic module frame 1 from separating from the press block 2 especially when wind is strong.

FIGS. 2-9 show some embodiments of the meshing structure 111 of the photovoltaic module frame 1. The meshing structure 111 may be arranged in various forms, referring to FIGS. 2-7. The meshing structure 111 includes a plurality of protrusion structures spaced apart from each other. The protrusion structure includes a plurality of embossments mutually separated and/or a plurality of ribs parallel arranged, referring to FIG. 8, FIG. 8 is a schematic diagram when the meshing structure is an embossment structure. When the protrusion structure adopts the embossments or the ribs, mechanical processing is convenient. In this embodiment, the rib extends in a direction perpendicular or approximately perpendicular to a direction where the photovoltaic module frame 1 and the press block 2 may be separated from each other, so as to maximize the contact area between the ribs and the corresponding matching structure 21 on the press block 2.

Referring to FIG. 4, a height of the protrusion structure protruding from the top is A. If the height A is too large, the installation part 11 is too thick. If the height A is too small, the meshing force is insufficient. In this embodiment, the height A satisfies: $0.1\ mm \leq A \leq 5\ mm$, so that the thickness of the installation part 11 is appropriate and the meshing force is sufficient. In an embodiment, the height A may also be 0.2 mm, 0.4 mm, 0.6 mm, 1 mm, 2 mm, or 3 mm. A distance between adjacent protrusion structures is B. If the distance B is too large, the number of protrusion structures is not enough. If the distance B is too small, the meshing force is insufficient. In this embodiment, the distance B satisfies: $0.2\ mm \leq B \leq 5\ mm$, so that the contact area is large and the meshing force is sufficient. In an embodiment, the distance B may also be 0.3 mm, 0.4 mm, 0.6 mm, 1 mm, 2 mm, or 3 mm.

In order to increase the contact area between the meshing structure 111 and the bottom of the press block 2, referring to FIG. 3, the meshing structure 111 completely covers the entire top of the installation part 11, thereby increasing the frictional contact area and increasing the meshing force.

Referring to FIG. 9, since the direction in which the photovoltaic module frame 1 and the press block 2 may be separated is a direction in which they face away from each other, in order to further save processing costs, the top of the photovoltaic module frame 1 includes a first region 112 adjacent to a side wall 114 of the installation part 11, and a second region 113 that abuts the first region 112. The first region 112 is located between the second region 113 and the side wall 114. The meshing structure 111 is provided in the second region 113. By arranging the first region 112 at a position of the top of the frame 1 close to the press block 2, and arranging the meshing structure 111 in the second region 113 away from the press block 2, the processing cost is saved and the friction effect is less affected. In this embodiment, the first region 112 is arranged to be a flat plane, and the corresponding position on the press block 2 is crimped with the first region 112 on the plane, therefore the frictional contact area with the press block 2 may be increased.

Referring to FIGS. 2-8, the number of the meshing structure 111 may be more than one, which is determined according to the area of the top, etc. In this embodiment, the photovoltaic module frame 1 includes at least two meshing structures 111 that are spaced apart on the top. In this embodiment, the expression "meshing structures 111 that are spaced apart on the top" means that the top is successively divided into different regions adjacent to each other, e.g., A, B, C, D, and E regions, the meshing structures 111 are arranged in some of these regions, e.g., A, C, and E regions, and are not arranged in the adjacent regions thereof. The meshing structures 111 are spaced apart so that the area occupied by the meshing structures 111 is reduced, thereby reducing the processing cost effectively.

Referring to FIGS. 2-7 and 9, the cross section of the meshing structure 111 may have various shapes which may be one or more of a zigzag structure, a trapezoidal structure, a U-shaped structure, or a wave-shaped structure. In this embodiment, the meshing structure 111 is a zigzag structure, which is convenient for processing. In other embodiments, other sectional shapes may also be used, which are specifically determined according to actual requirements.

Figure 10:
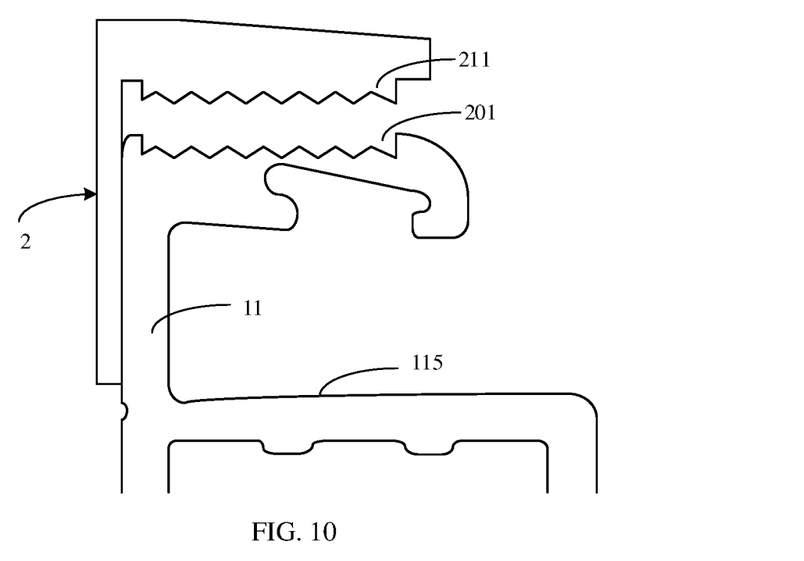
FIG. 10 is a schematic structural diagram showing a press block and a photovoltaic module frame in a disassembled state according to an embodiment of the present disclosure.

As shown in FIG. 10, FIG. 10 is a schematic structural diagram showing the press block and the photovoltaic module frame in a disassembled state according to an embodiment of the present disclosure. In an embodiment, the top of the installation part 11 has a first concave region 201. The meshing structure 111 is located at the top corresponding to the first concave region 201. Correspondingly, the bottom of the press block 2 has a second convex region 211. The matching structure 21 of the bottom of the press block 2 is located at the bottom corresponding to the second convex region 211. Since the first concave region 201 and the second convex region 211 are mutually meshed, the stability between the press block 2 and the installation part 11 may be further improved. In an embodiment, the first concave region 201 and the second convex region 211 are meshed with each other, that is, the concave side corresponding to the first concave region 201 is fitted to the convex side corresponding to the second convex region 211. Therefore, the stability between the press block 2 and the installation part 11 may be further enhanced by the meshing manner.

Figure 11:
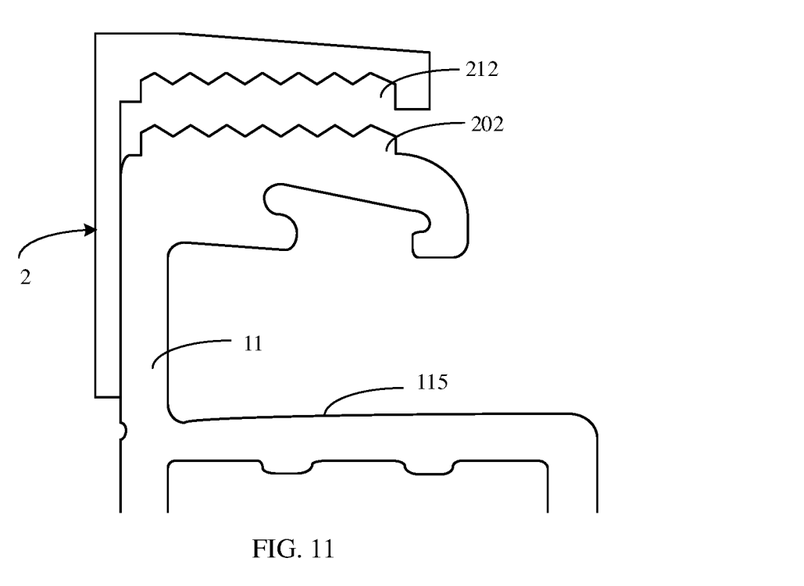
FIG. 11 is a schematic structural diagram showing a press block and a photovoltaic module frame in a disassembled state according to another embodiment of the present disclosure.

As shown in FIG. 11, FIG. 11 is a schematic structural diagram of the press block and the photovoltaic module frame in a disassembled state according to another embodiment of the present disclosure. In an embodiment, the top of the installation part 11 has a first convex region 202. The meshing structure 111 is located at the top corresponding to the first convex region. Correspondingly, the bottom of the press block 2 has a second concave region 212. The matching structure 21 is located at the bottom corresponding to the second concave region 212. Since the first convex region 202 and the second concave region 212 are mutually meshed, the stability between the press block 2 and the installation part 11 may be further improved. In an embodiment, the first convex region 202 and the second concave region 212 are meshed with each other, that is, the convex side corresponding to the first convex region 202 is attached to the concave side corresponding to the second concave region 212. Therefore, the stability between the press block 2 and the installation part 11 may be further enhanced by the meshing manner.

In addition, the depth of the first concave region 201 should not be too deep, because if the depth is too deep, the strength of the installation part 11 may be easily affected, and after the press block 22 exerts a certain pressure on the installation part 11, the installation part 11 may be damaged and, moreover, the process of manufacturing the meshing structure 111 may be difficult. To this end, the depth of the first concave region 201 is less than or equal to 2 cm, e.g., 1 cm, 0.5 cm, 0.1 cm, 0.05 cm, etc. Similarly, the height of the first convex region 202 is less than or equal to 2 cm.

In addition, the installation part 11 has a bottom surface opposite to the top. An orthographic projection of the meshing structure 111 in the bottom surface has a first area, and an orthographic projection of the first convex region 201 or the first concave region 202 in the bottom surface has a second area. If a ratio of the second area to the first area is too small, on the one hand, it is not conducive to producing the meshing structure 111 conveniently, on the other hand, if the second area is relatively small, after the press block 2 applies a certain pressure to the installation part 11, the corresponding intensity of pressure is larger, which is not conducive to the stability of the installation part 11. If the ratio of the second area to the first area is too large, the area corresponding to the meshing structure 111 is relatively small, the effect of increasing stability between the block 2 and the installation part 11 provided by the meshing structure 111 is limited. To this end, the first area and the second area may satisfy: $1.1*S1 \leq S2 \leq 1.3*S2$, wherein S1 is the first area and S2 is the second area. This configuration may increase the stability between the press block 2 and the installation part 11, and also ensure the stability of the installation part 11.

Figure 12:
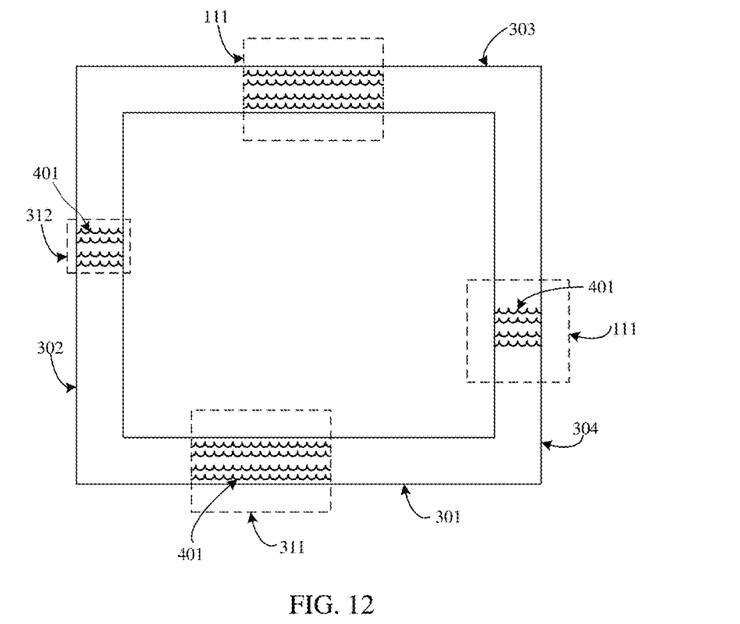
FIG. 12 is a top structural diagram showing a photovoltaic module frame according to another embodiment of the present disclosure.

As shown in FIG. 12, FIG. 12 is a top view showing a photovoltaic module frame according to another embodiment of the present disclosure. In an embodiment, the installation part 11 includes a first installation part 301 and a second installation part 302 that are connected to each other. An extending direction of the top of the first installation part 301 is different from an extending direction of the top of the second installation part 302. The meshing structure 111 includes a first meshing structure 311 provided on the top of the first installation part 301, and a second meshing structure 312 provided on the top of the second installation part 302. An extending direction of the protrusion structure 401 of the first meshing structure 301 is the same as an extending direction of the top of the first installation part 301. An extending direction of the protrusion structure 401 of the second meshing structure 312 is perpendicular to an extending direction of the top of the second installation part 302.

In the actual application of photovoltaic modules, it is found that in order to adapt to the change of the light angle of sunlight in different time period, the placement direction of the photovoltaic modules is usually inclined with respect to the direction of gravity, so that the direction of possible separation between the first installation part 301 and the press block 2 is different from the direction of possible separation between the second installation part 302 and the press block 2. In order to better match the actual application, sliding shall not occur both between the first installation part 301 and the press block 2, and between the second installation part 302 and the press block 2, therefore the first meshing structure 311 and the second meshing structure 312 mentioned above are proposed.

Figure 13:
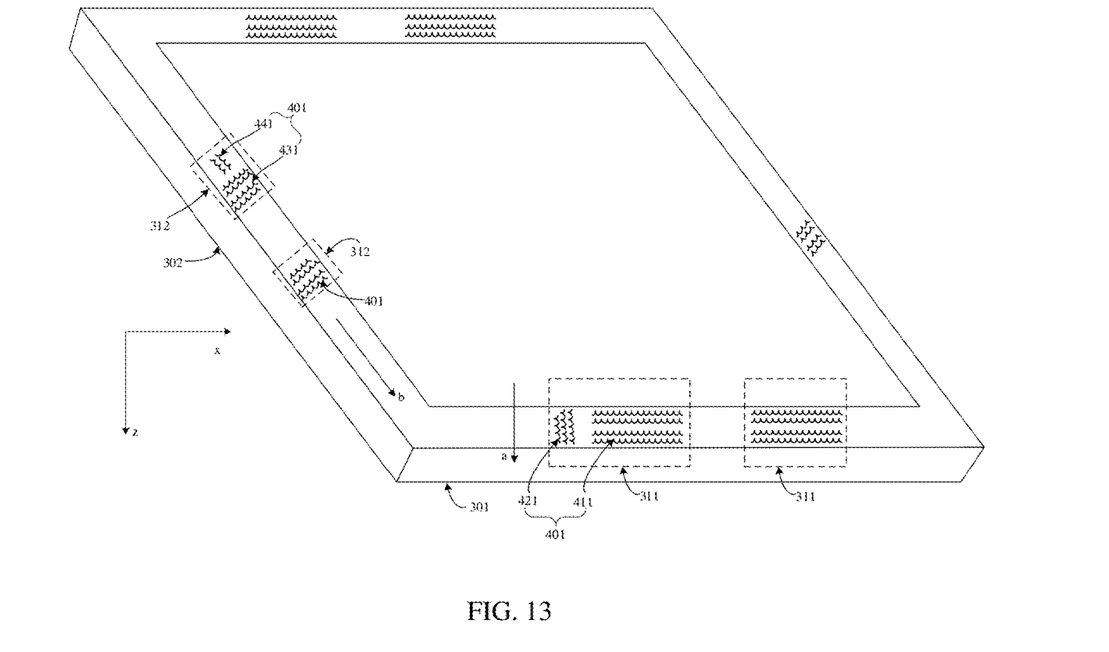
FIG. 13 is a schematic diagram showing installation of a photovoltaic module frame according to an embodiment of the present disclosure.

For ease of description, FIG. 13 is a schematic diagram showing installation of a photovoltaic module frame according to an embodiment of the present disclosure. The extending direction of the top of the first installation part 301 is the same as the horizontal direction, i.e., an x direction. The extending direction of the top of the second installation part 302 has an inclination angle relative to both the x direction and the direction of gravity, i.e., a z-direction. That is, the first installation part 301 may be placed facing downward, the extending direction of the first installation part 301 is the same as the horizontal direction, and the second installation part 302 extends upward. As shown in FIG. 13, the direction of possible separation between the press block 2 and the first installation part 301 is a first separation direction a which is parallel to the top surface of the first installation part 301 and perpendicular to the extending direction of the top of the first installation part 301. Since the extending direction of the protrusion structure 401 in the first meshing structure 311 is perpendicular to the first separation direction a, the protrusion structure 401 may well prevent the press block 2 from separating along the first separation direction a. The direction of possible separation between the press block 2 and the second installation part 302 is a second separation direction b which is parallel to the top surface of the second installation part 302 and perpendicular to the extending direction of the top of the second installation part 302. Since the extending direction of the protrusion structure 401 in the second meshing structure 312 is perpendicular to the second separation direction b, the protrusion structure 401 may well prevent the press block 2 from separating along the second separation direction b.

In an embodiment, as shown in FIG. 13, for the same first meshing structure 311, the extending direction of at least one protrusion structures 401 is perpendicular to the extending direction of the top of the first installation part 301. The purpose of this configuration is: although for the press block 2 corresponding to the first installation part 301, the press block 2 has obvious separation tendency to move along the first separation direction a, the press block 2 also has the possibility of moving along other direction, e.g., moving along the direction parallel to the extending direction of the top of the first installation part 301. The configuration of the protrusion structure may further prevent the press block 2 from moving in other directions, thereby further improving the stability between the press block 2 and the photovoltaic module frame 1.

In an embodiment, for the same first meshing structure 311 including a first protrusion structure 411 and a second protrusion structure 421, the extending direction of the first protrusion structure 411 is parallel to the extending direction of the top of the first installation part 301, and the extending direction of the second protrusion structure 421 is perpendicular to the extending direction of the top of the first installation part 301. The number of the second protrusion structure 421 is less than the number of the first protrusion structure 411. The length of the second protrusion structure 421 of is less than the length of the first protrusion structure 411. Because for the first installation part 301, the press block 2 has the most significant movement tendency in the first separation direction a, and since the number of the second protrusion structures 421 is less than the number of the first protrusion structures 411, the press block 2 is prohibited from separating toward the first separation direction a, moreover, the press block 2 is prohibited from separating along other directions, thereby further improving the stability between the press block 2 and the photovoltaic module frame 1.

Similarly, for the same second meshing structure 312, the extending direction of the at least one protrusion structure 401 is parallel to the extending direction of the top of the second installation part 302. In an embodiment, for the same second meshing structure 312 including a third protrusion structure 431 and a fourth protrusion structure 441 are included, the extending direction of the third protrusion structure 431 is perpendicular to the extending direction of the top of the second installation part 302, and the extending direction of the fourth protrusion structure 441 is parallel to the extending direction of the top of the second installation part 302. The number of the fourth protrusion structure 441 may be less than the number of the third protrusion structure 431. The length of the fourth protrusion structure 441 may be less than the length of the third protrusion structure 431.

Figure 14:
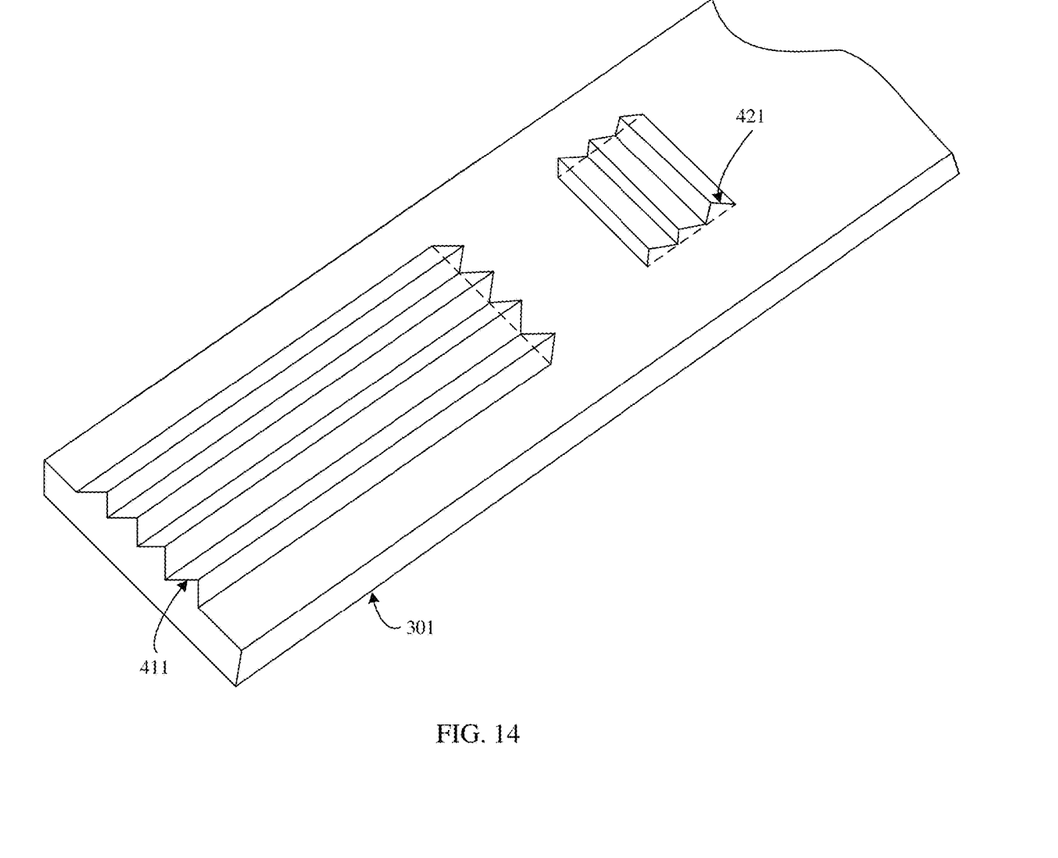
FIG. 14 is a schematic structural diagram showing a portion of a first installation part according to an embodiment of the present disclosure.

FIG. 14 is a schematic structural diagram showing a portion of a first installation part according to an embodiment of the present disclosure. As shown in FIG. 14, the extending direction of the first protrusion structure 411 is the same as the extending direction of the top of the first installation part 301. The extending direction of the second protrusion structure 412 is perpendicular to the extending direction of the top of the first installation part 301.

In addition, the installation part 11 may further include a third installation part 303 and a fourth installation part 304. The third installation part 303 is opposite to the first installation part 301, and the fourth installation part 304 is opposite to the second installation part 302. The arrangement manner of the third meshing structure 11 on the installation part 303 may be the same as the arrangement manner of the meshing structure 11 on the first installation part 301, and the arrangement manner of the meshing structure 11 on the fourth installation part 304 may be the same as the arrangement manner of the meshing structure 11 on the second installation part 302.

In order to achieve the above object, the present disclosure also provides a press block 2 which cooperates with the photovoltaic module frame 1 described above. The bottom of the press block 2 has a matching structure 21 that meshes with the meshing structure 111. The matching structure 21 is configured to match the meshing structure 111 so that the matching structure 21 meshes with the meshing structure 111. Referring to FIG. 2, when the meshing structure 111 is a zigzag structure, the matching structure 21 is also a zigzag structure that cooperates with the meshing structure 111. When the meshing structure 111 is a trapezoidal structure, the matching structure 21 is also a trapezoidal structure that cooperates with the meshing structure 111 (not shown in the drawing).

In order to achieve the above-mentioned object, the present disclosure also provides a photovoltaic support assembly. The photovoltaic support assembly includes the above-mentioned photovoltaic module frame 1 and the above-mentioned press block 2. The press block 2 is meshed with the photovoltaic module frame 1. The bottom of the press block 2 has a matching structure that meshes with the meshing structure 111, and the press block 2 is meshed with the photovoltaic module frame 1.

It should be noted that the embodiments of the photovoltaic support assembly according to the present disclosure include the embodiments of the above-mentioned photovoltaic module frame 1 and the press block 2. The relevant technical details mentioned in the embodiments of the above-mentioned photovoltaic module frame 1 and the press block 2 are still applicable to the photovoltaic support assembly, and the technical effects achieved in the embodiments of the photovoltaic module frame 1 and the press block 2 are also applicable to the embodiments of the photovoltaic support assembly according to the present disclosure.

In addition, in an embodiment, the press block 2 is a magnetic press block, and the photovoltaic module frame 1 is a steel frame. The magnetic cooperation between the photovoltaic module frame 1 and the press block 2 further improves the stability between the press block 2 and the photovoltaic module frame 1. In another embodiment, it may further include an adhesive layer arranged between the meshing structure 111 and the matching structure 21. The adhesive layer may be a thermosetting adhesive layer or a UV-curing adhesive layer.

In order to achieve the above object, the present disclosure further provides a photovoltaic module which includes the above photovoltaic support assembly. Referring to FIG. 3, the photovoltaic module further includes a laminate 3 which is clamped by the photovoltaic module frame 1.

It should be noted that the embodiments of the photovoltaic module according to the present disclosure include the embodiments of the photovoltaic support assembly described above. The relevant technical details mentioned in the embodiments of the photovoltaic support assembly are also applicable to the photovoltaic module. The technical effects achieved by the embodiment of the photovoltaic support assembly are also applicable to the embodiments of the photovoltaic module according to the present disclosure.

The above are merely preferred embodiments of the present disclosure, and are not intended to limit the scope of the present disclosure. Under the inventive concept of the present disclosure, equivalent structural transformations made using the contents of the description and drawings of the present disclosure, or the contents directly or indirectly applied to other related technical fields are included in the protection scope of the present disclosure.

What is claimed is:

1. A photovoltaic module frame, comprising:
an installation part having a top provided with at least one meshing structure for meshing with a bottom of a press block,
wherein each of the at least one meshing structure comprises a plurality of protrusion structures spaced apart from each other, and the plurality of protrusion structures comprises at least one of: a plurality of embossments separated from each other or a plurality of ribs arranged parallel to each other,
wherein the installation part comprises a first installation part and a second installation part that are connected to each other, and an extending direction of a top of the first installation part is different from an extending direction of a top of the second installation part; and
the meshing structure comprises a first meshing structure provided on the top of the first installation part and a second meshing structure provided on the top of the second installation part, an extending direction of the protrusion structure of the first meshing structure is the same as an extending direction of the top of the first installation part, and an extending direction of the protrusion structure of the second meshing structure is perpendicular to an extending direction of the top of the second installation part.

2. The photovoltaic module frame according to claim 1, wherein a height of each of the plurality of protrusion structures protruding from the top of the installation part is less than or equal to 5 mm and greater than or equal to 0.1 mm.

3. The photovoltaic module frame according to claim 1, wherein the top of the installation part has a first convex region, the at least one meshing structure is located at a position of the top corresponding to the first convex region.

4. The photovoltaic module frame according to claim 3, wherein a height of the first convex region is less than or equal to 2 cm.

5. The photovoltaic module frame according to claim 3, wherein the installation part has a bottom opposite to the top, an orthographic projection of the meshing structure on the bottom has a first area S1, and an orthographic projection of the first convex region on the bottom has a second area S2, and the first area S1 and the second area S2 satisfy: $1.1*S1 \leq S2 \leq 1.3*S1$.

6. The photovoltaic module frame according to claim 1, wherein the at least one meshing structure completely covers the entire top of the installation part.

7. The photovoltaic module frame according to claim 1, wherein the top of the installation part comprises a first region adjacent to a side wall of the installation part and a second region abutting with the first region, the first region is located between the second region and the side wall, and the at least one meshing structure is provided in the second region.

8. The photovoltaic module frame according to claim 1, wherein the at least one meshing structure comprises at least two meshing structures spaced apart from each other on the top of the installation part.

9. The photovoltaic module frame according to claim 1, wherein the meshing structure comprises at least one of a zigzag structure or a wave-shaped structure.

10. The photovoltaic module frame according to claim 1, wherein a distance between adjacent two of the plurality of protrusion structures is less than or equal to 5 mm and greater than or equal to 0.2 mm.

11. The photovoltaic module frame according to claim 1, wherein the top of the installation part has a first concave region, the at least one meshing structure is located at a position of the top corresponding to the first concave region.

12. The photovoltaic module frame according to claim 11, wherein a depth of the first concave region is less than or equal to 2 cm.

13. A photovoltaic support assembly, comprising:
a photovoltaic module frame comprising an installation part having a top provided with at least one meshing structure for meshing with a bottom of a press block; and
a press block meshing with the photovoltaic module frame, wherein a bottom of the press block has a matching structure meshing with the at least one meshing structure,
wherein each of the at least one meshing structure comprises a plurality of protrusion structures spaced apart from each other, and the plurality of protrusion structures comprises at least one of: a plurality of embossments separated from each other or a plurality of ribs arranged parallel to each other,
wherein the installation part comprises a first installation part and a second installation part that are connected to each other, and an extending direction of a top of the first installation part is different from an extending direction of a top of the second installation part; and
the meshing structure comprises a first meshing structure provided on the top of the first installation part and a second meshing structure provided on the top of the second installation part, an extending direction of the protrusion structure of the first meshing structure is the same as an extending direction of the top of the first installation part, and an extending direction of the protrusion structure of the second meshing structure is perpendicular to an extending direction of the top of the second installation part.

14. The photovoltaic support assembly according to claim 13, wherein the press block is a magnetic press block, and the photovoltaic module frame is a steel frame.

15. The photovoltaic support assembly according to claim 13, wherein the bottom of the press block has a second concave region, the matching structure is located at a position of the bottom corresponding to the second concave region, and the second concave region corresponds to a first convex region.

16. The photovoltaic support assembly according to claim 13, further comprising an adhesive layer arranged between the meshing structure and the matching structure.

17. The photovoltaic support assembly according to claim 13, wherein the bottom of the press block has a second convex region, the matching structure is located at a position of the bottom corresponding to the second convex region, and the second convex region corresponds to a first concave region.

18. A photovoltaic module, comprising a photovoltaic support assembly, wherein the photovoltaic support assembly comprises:
a photovoltaic module frame comprising an installation part having a top provided with at least one meshing structure for meshing with a bottom of a press block; and
a press block meshing with the photovoltaic module frame, wherein a bottom of the press block has a matching structure meshed with the at least one meshing structure,
wherein each of the at least one meshing structure comprises a plurality of protrusion structures spaced apart from each other, and the plurality of protrusion structures comprises at least one of: a plurality of embossments separated from each other or a plurality of ribs arranged parallel to each other,
wherein the installation part comprises a first installation part and a second installation part that are connected to each other, and an extending direction of a top of the first installation part is different from an extending direction of a top of the second installation part; and
the meshing structure comprises a first meshing structure provided on the top of the first installation part and a second meshing structure provided on the top of the second installation part, an extending direction of the protrusion structure of the first meshing structure is the same as an extending direction of the top of the first installation part, and an extending direction of the protrusion structure of the second meshing structure is perpendicular to an extending direction of the top of the second installation part.

* * * * *